UNITED STATES PATENT OFFICE.

GUSTAV PETERS, OF HOBOKEN, NEW JERSEY.

PROCESS OF MAKING BAKERS' PRODUCTS.

1,077,552.  Specification of Letters Patent.  Patented Nov. 4, 1913.

No Drawing.  Application filed December 20, 1912.  Serial No. 737,822.

*To all whom it may concern:*

Be it known that I, GUSTAV PETERS, a citizen of the United States, residing at Hoboken, county of Hudson, and State of New Jersey, have invented a new and Improved Process of Making Bakers' Products, of which the following is a specification.

This invention relates to an improved method of making bread, cake or a similar baker's food product, which is easily digestible and possesses superior nourishing qualities, so that it is particularly adapted for patients and convalescing or other persons of delicate health.

In carrying out my invention, there are first separately prepared a kephir milk, and an egg albumen water, in the following manner:

*Kephir milk.*—One half ounce of kephir grains is steeped in hot water which has previously been boiled. After 4–5 hours the water is poured off, the grains are steeped into a new body of hot water, and the operation is repeated say four or five times, when the grains will have become thoroughly softened. The grains are now placed in a vessel containing milk having a temperature of 68° F. and which had also previously been boiled, the weight of the milk being equal to about ten times the original weight of the kephir grains. The vessel is covered with muslin and is shaken from time to time during say 6–12 hours or until the grains will rise and float upon the surface. The milk thus impregnated with the principle of the grain is strained off and mixed in a bottle with a quantity of pure or natural milk which had previously been boiled and then cooled down to a temperature of 68° F., the proportion being about three parts of impregnated milk to five parts of pure milk. The bottle being well corked and its temperature reduced to about 60° F., is repeatedly shaken, until its contents thicken, which will take place in say 14–24 hours. Finally the bottle is transferred to a cool place, where it is again agitated from time to time, its charge of kephir milk being ready for application in about three days.

During the above described operations, care should be taken that the prescribed temperatures should be observed, as they are important for insuring a satisfactory result. Of course, the grains may be softened in cold water instead of in hot water, but this would unnecessarily prolong the operation. The kephir grains segregated from the impregnated milk may be used over again on a new body of milk.

*Egg albumen water.*—Dissolve one ounce of egg albumen in one quart of water at a temperature of 60° F., and which had previously been boiled. Shake the mixture well from time to time during about 24 hours, after which the resulting albumen water is ready for application.

*Baking bread.*—Dissolve four ounces of yeast in two quarts of warm water, add one quart of kephir milk and one quart of egg albumen water. Raise the temperature to 80° F. in case the dough is to be worked by hand, and to 70–74° F. when to be worked by machine. Stir in two ounces of sugar, two ounces of fat (butter or lard), four ounces of salt and make a dough with 15–16 pounds of flour which should not be too stiff. Place the dough in a warm room for several hours, so that it will raise, knead it, allow it to raise again, divide off batches of suitable size and thoroughly bake the same in an oven which should not be excessively hot.

For making cake, zwieback and similar bakers' products, the above process is of course modified and adapted to the particular article desired.

The finished product is easily digestible, has an agreeable sourish flavor and possesses superior nutritive qualities, so that it is well adapted for nourishing patients and other delicate persons.

I claim:

1. Process of making sanitary bread, cake and similar bakers' products which consists in preparing a mixture of kephir-impregnated milk with natural milk, separately preparing egg albumen dissolved in water, forming a dough containing flour together with said kephir milk-mixture and said egg albumen, and baking said dough.

2. A step in making a dough for sanitary bread, cake and similar bakers' products which consists in preparing a component part of said dough in the following manner: impregnating milk at about 68° F. with the principle of softened kephir grains, mixing the impregnated milk with a body of natural milk at about a like temperature, reducing the temperature of the mixture, and agitating the same repeatedly until thickening.

GUSTAV PETERS.

Witnesses:
 FRANK V. BRIESEN,
 KATHERYNE KOCH.